(12) United States Patent
Spiegel

(10) Patent No.: US 9,160,548 B2
(45) Date of Patent: *Oct. 13, 2015

(54) MINING OF USER EVENT DATA TO IDENTIFY USERS WITH COMMON INTERESTS

(71) Applicant: Amazon Technologies, Inc., Seattle, WA (US)

(72) Inventor: Joel R. Spiegel, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,566

(22) Filed: Nov. 17, 2014

(65) Prior Publication Data

US 2015/0066791 A1    Mar. 5, 2015

Related U.S. Application Data

(63) Continuation of application No. 14/047,868, filed on Oct. 7, 2013, now Pat. No. 8,892,508, which is a continuation of application No. 13/548,047, filed on Jul. 12, 2012, now Pat. No. 8,554,723, which is a (Continued)

(51) Int. Cl.
*G06F 17/30* (2006.01)
*H04L 12/18* (2006.01)
(Continued)

(52) U.S. Cl.
CPC ...... *H04L 12/1813* (2013.01); *G06F 17/30386* (2013.01); *G06F 17/30539* (2013.01); *G06Q 30/02* (2013.01); *G06Q 30/08* (2013.01); *G06Q 50/01* (2013.01)

(58) Field of Classification Search
CPC .................................................. G06F 17/30174
USPC .......................................................... 707/609
See application file for complete search history.

(56) References Cited

U.S. PATENT DOCUMENTS 4,996,642 A    2/1991   Hey
5,749,081 A    5/1998   Whiteis
(Continued)

FOREIGN PATENT DOCUMENTS

WO    WO0062223 A1    10/2000
WO    WO0125947 A1    4/2001

OTHER PUBLICATIONS

Hu et al., Evaluation of user interface designs for information retrieval systems: a computer-based experiment, 1999, 19 pages.*

(Continued)

*Primary Examiner* — Noosha Arjomandi
(74) *Attorney, Agent, or Firm* — Knobbe Martens Olson & Bear LLP

(57) ABSTRACT

A computer-implemented matching service matches users to other users, and/or to user communities, based at least in part on a computer analysis of event data reflective of user behaviors. The event data may, for example, evidence user affinities for particular items represented in an electronic catalog, such as book titles, music titles, movie titles, and/or other types of items that tend to reflect the traits of users. Event data reflective of other types of user actions, such as item-detail-page viewing events, browse node visits, search query submissions, and/or web browsing patterns may additionally or alternatively be considered. By taking such event data into consideration, the matching service reduces the burden on users to explicitly supply personal profile information, and reduces poor results caused by exaggerations and other inaccuracies in such profile information.

20 Claims, 7 Drawing Sheets

Related U.S. Application Data continuation of application No. 13/290,859, filed on Nov. 7, 2011, now Pat. No. 8,224,773, which is a continuation of application No. 11/093,507, filed on Mar. 30, 2005, now Pat. No. 8,060,463.

(51) Int. Cl.

| G06Q 30/02 | (2012.01) |
|---|---|
| G06Q 30/08 | (2012.01) |
| G06Q 50/00 | (2012.01) |

(56) References Cited

U.S. PATENT DOCUMENTS

| 6,041,311 | A | 3/2000 | Chislenko et al. |
|---|---|---|---|
| 6,175,831 | B1 | 1/2001 | Weinreich et al. |
| 6,195,657 | B1 | 2/2001 | Rucker et al. |
| 6,249,282 | B1 | 6/2001 | Sutcliffe et al. |
| 6,266,649 | B1 | 7/2001 | Linden et al. |
| 6,269,369 | B1 | 7/2001 | Robertson |
| 6,321,221 | B1 | 11/2001 | Bieganski |
| 6,438,579 | B1 | 8/2002 | Hosken |
| 6,519,629 | B2 | 2/2003 | Harvey et al. |
| 6,647,355 | B2 | 11/2003 | Heinberg et al. |
| 6,681,247 | B1 | 1/2004 | Payton |
| 6,735,568 | B1 | 5/2004 | Buckwalter et al. |
| 6,853,982 | B2 | 2/2005 | Smith et al. |
| 6,963,850 | B1 | 11/2005 | Bezos et al. |
| 7,069,308 | B2 | 6/2006 | Abrams |
| 7,158,986 | B1* | 1/2007 | Oliver et al. ............ 1/1 |
| 7,203,909 | B1* | 4/2007 | Horvitz et al. ......... 715/765 |
| 7,240,055 | B2 | 7/2007 | Grasso et al. |
| 7,254,552 | B2 | 8/2007 | Bezos et al. |
| 7,409,362 | B2 | 8/2008 | Calabria |
| 7,519,562 | B1 | 4/2009 | Vander Mey et al. |
| 7,617,160 | B1* | 11/2009 | Grove et al. ........... 705/500 |
| 7,630,986 | B1 | 12/2009 | Herz et al. |
| 7,657,458 | B2 | 2/2010 | Calabria |
| 7,689,452 | B2 | 3/2010 | Lam et al. |
| 7,698,165 | B1 | 4/2010 | Tawakol et al. |
| 7,739,139 | B2 | 6/2010 | Robertson et al. |
| 7,739,153 | B1 | 6/2010 | Anderson et al. |
| 7,747,630 | B2 | 6/2010 | Scofield et al. |
| 7,752,081 | B2 | 7/2010 | Calabria |
| 7,752,082 | B2 | 7/2010 | Calabria |
| 7,756,753 | B1 | 7/2010 | McFarland |
| 7,756,756 | B1 | 7/2010 | Lifson |
| 7,761,342 | B2 | 7/2010 | Calabria |
| 7,761,343 | B2 | 7/2010 | Calabria |
| 7,778,926 | B1 | 8/2010 | Grinchenko et al. |
| 7,822,646 | B2 | 10/2010 | Calabria |
| 7,827,055 | B1 | 11/2010 | Snodgrass et al. |
| 7,827,208 | B2 | 11/2010 | Bosworth et al. |
| 7,831,548 | B1 | 11/2010 | Round et al. |
| 7,881,975 | B2 | 2/2011 | Calabria |
| 7,949,573 | B1 | 5/2011 | Cohen et al. |
| 7,970,665 | B1 | 6/2011 | Lifson |
| 8,060,463 | B1 | 11/2011 | Spiegel |
| 8,091,032 | B2 | 1/2012 | Fischer |
| 8,095,432 | B1 | 1/2012 | Berman et al. |
| 8,181,111 | B1 | 5/2012 | Onyon et al. |
| 8,260,787 | B2 | 9/2012 | Lam et al. |
| 8,285,840 | B2 | 10/2012 | Dobroth et al. |
| 8,433,620 | B2 | 4/2013 | Futty et al. |
| 2001/0014868 | A1 | 8/2001 | Herz et al. |
| 2001/0037255 | A1 | 11/2001 | Tambay et al. |
| 2003/0078686 | A1* | 4/2003 | Ma et al. ............ 700/91 |
| 2003/0093329 | A1 | 5/2003 | Gutta |
| 2003/0093793 | A1 | 5/2003 | Gutta |
| 2003/0167222 | A1 | 9/2003 | Mehrotra et al. |
| 2003/0172004 | A1 | 9/2003 | Anderson |
| 2003/0220802 | A1 | 11/2003 | Cossey et al. |
| 2003/0229537 | A1 | 12/2003 | Dunning et al. |
| 2004/0059626 | A1 | 3/2004 | Smallwood |
| 2004/0113933 | A1* | 6/2004 | Guler ............ 345/716 |
| 2004/0172355 | A1* | 9/2004 | Pandher ............ 705/37 |
| 2004/0230511 | A1 | 11/2004 | Kannan et al. |
| 2005/0033656 | A1 | 2/2005 | Wang et al. |
| 2005/0033803 | A1 | 2/2005 | Vleet et al. |
| 2005/0038717 | A1 | 2/2005 | McQueen, III et al. |
| 2005/0080520 | A1* | 4/2005 | Kline et al. ............ 701/1 |
| 2005/0171832 | A1 | 8/2005 | Hull et al. |
| 2005/0171955 | A1 | 8/2005 | Hull et al. |
| 2005/0177385 | A1 | 8/2005 | Hull et al. |
| 2005/0197894 | A1* | 9/2005 | Fairbanks et al. ............ 705/14 |
| 2005/0203807 | A1 | 9/2005 | Bezos et al. |
| 2005/0256756 | A1 | 11/2005 | Lam et al. |
| 2005/0261989 | A1 | 11/2005 | Vadon et al. |
| 2005/0273378 | A1 | 12/2005 | MacDonald-Korth et al. |
| 2006/0026033 | A1 | 2/2006 | Brydon et al. |
| 2006/0085259 | A1 | 4/2006 | Nicholas et al. |
| 2006/0190536 | A1 | 8/2006 | Strong et al. |
| 2006/0200432 | A1 | 9/2006 | Flinn et al. |
| 2006/0218153 | A1 | 9/2006 | Voon et al. |
| 2006/0218225 | A1 | 9/2006 | Hee Voon et al. |
| 2007/0064626 | A1 | 3/2007 | Evans |
| 2007/0179863 | A1 | 8/2007 | Stoll |
| 2008/0033739 | A1 | 2/2008 | Zuckerberg et al. |
| 2008/0189274 | A1 | 8/2008 | Mann |
| 2008/0189768 | A1 | 8/2008 | Callahan et al. |
| 2008/0235111 | A1 | 9/2008 | Dotan et al. |
| 2008/0243628 | A1 | 10/2008 | Wiseman et al. |
| 2008/0255933 | A1 | 10/2008 | Leventhal et al. |
| 2008/0255934 | A1 | 10/2008 | Leventhal et al. |
| 2009/0319288 | A1 | 12/2009 | Slaney et al. |
| 2011/0093336 | A1 | 4/2011 | Calabria |
| 2011/0258073 | A1 | 10/2011 | Lifson |
| 2012/0158539 | A1 | 6/2012 | Lawrence et al. |
| 2014/0101255 | A1* | 4/2014 | Pal et al. ............ 709/204 |
| 2014/0222834 | A1* | 8/2014 | Parikh et al. ............ 707/748 |

OTHER PUBLICATIONS

Adamic et al., Friends and neighbors on the Web, 2003, 20 pages.*
Social Networking—A Site Comparison, dated Mar. 3, 2004, in The Search Engine Journal, printed from searchenginejournal.com/index.php?p=332 (of-record in parent application).
Setten, et al., Harvesting Social Network Profiles for Recommendations, Jan. 9, 2005, 104 pages (of-record in parent application).
Ganesan, et al., Exploiting Hierarchical Domain Structures to Compute Similarity, 30 pages (of-record in parent application).
Balabanovic, et al., Content-Based, Collaborative Recommendation, 1997, 7 pages (of-record in parent application).
Next-Generation Flavor in Integrated Online Catalogs., Library Technology Reports, Jul./Aug. 2007, vol. 43, Issue 4, p. 38, Chicago.
Referral Web: Combining Social Networks and Collaborative Filtering., Communications of the ACM. Mar. 1997, vol. 40, No. 3, pp. 63-65.

* cited by examiner

MINING OF USER EVENT DATA TO IDENTIFY USERS WITH COMMON INTERESTS

CROSS REFERENCE TO RELATED APPLICATIONS

This application is a continuation of U.S. patent application Ser. No. 14/047,868, now U.S. Pat. No. 8,892,508, entitled "MINING OF USER EVENT DATA TO IDENTIFY USERS WITH COMMON INTEREST," and filed on Oct, 7, 2013, which in turn is a continuation of U.S. patent application Ser. No. 13/548,047, now U.S. Pat. No. 8,554,723, entitled "MINING OF USER EVENT DATA TO IDENTIFY USERS WITH COMMON INTERESTS" and filed Jul. 12, 2012, which in turn is a continuation of U.S. patent application Ser. No. 13/290,859, now U.S. Pat. No. 8,224,773, entitled "MINING OF USER EVENT DATA TO IDENTIFY USERS WITH COMMON INTERESTS" and filed Nov. 7, 2011, which in turn is a continuation of U.S. patent application Ser. No. 11/093,507, now U.S. Pat. No. 8,060,463, entitled "MINING OF USER EVENT DATA TO IDENTIFY USERS WITH COMMON INTERESTS" and filed on Mar. 30, 2005, the disclosures of which are herein incorporated by reference.

BACKGROUND OF THE INVENTION

1. Field of the Invention

The present invention relates to social networking systems, and to associated data mining methods for identifying people having similar interests or characteristics.

2. Description of the Related Art

A variety of web sites exist that provide matching services for assisting people in locating other people with which to establish a personal relationship. Typically, users of such matching services must initially supply relatively large amounts of personal profile information, such as information about their respective interests, educational backgrounds, ages, professions, appearances, beliefs, and preferences for others. The profile information supplied by the users is compared by the matching service to identify and connect users that are predicted to be good candidates for forming a personal relationship. Matching services also exists for connecting people that have related business objectives.

One problem with existing matching services is that the participants sometimes supply inaccurate or misleading personal descriptions. As a result, the users are commonly disappointed with the recommendations made by the matching service. Another problem is that the task of creating a personal profile that is sufficiently detailed to produce satisfactory results can be burdensome to users, potentially deterring users from using the matching service.

SUMMARY

The present invention provides a computer-implemented matching service that takes into consideration the behaviors of users, and particularly behaviors that strongly reflect the interests of users. The analyzed behaviors may include or reflect any of a variety of different types of user actions that can be monitored or tracked via a computer network. For example, the analyzed behaviors may include the item purchases, item rentals, item viewing activities, web browsing activities, and/or search histories of the users.

In one embodiment, the matching service identifies users with similar interests based, at least in part, on a computer analysis of user event data reflective of user affinities for particular items, and/or categories of items, represented in an electronic catalog. The items may, for example, include book titles, music titles, movie titles, and/or other types of items that tend to reflect the traits and interests of users having affinities for such items. The event data may, for example, include user order histories indicative of the particular items purchased and/or rented by each user. Event data reflective of other types of user actions, such as item-detail-page viewing events, browse node visits, and/or search query submissions, may additionally or alternatively be considered. By taking catalog-item-related event data into consideration, the matching service reduces the burden on users to explicitly supply personal profile information, and reduces poor results caused by exaggerations and other inaccuracies in such profile information.

Another aspect of the invention involves using the event data associated with catalog items to match users to groups or communities of users, such as communities associated with particular clubs, companies, other types of organizations, or topics. In one embodiment, the event data of users is periodically analyzed in conjunction with community affiliation data to identify, for each user community, a set of items (and/or item categories) that "characterize" members of that community. This may be accomplished, for example, by identifying those items (and/or item categories) that have significantly higher popularity levels in a particular community than among a general population of users. Once identified, the community-specific sets of characterizing items (and/or item categories) are compared to the item-related event data of individual users to identify and recommend communities, or associated organizations, to particular users.

The invention may also be implemented outside the context of an electronic catalog of items. For example, users may be matched to users and/or communities based on their web browsing and search histories across the World Wide Web, or based on other types of non-catalog-related events that may be tracked via a computer network.

Neither this summary nor the following detailed description purports to define the invention. The invention is defined by the claims.

DETAILED DESCRIPTION OF SPECIFIC EMBODIMENTS

A system that embodies various aspects and features of the invention will now be described with reference to the drawings. This description is intended to illustrate, and not limit, the present invention. The scope of the invention is defined by the claims.

I. System Overview

Figure 1:
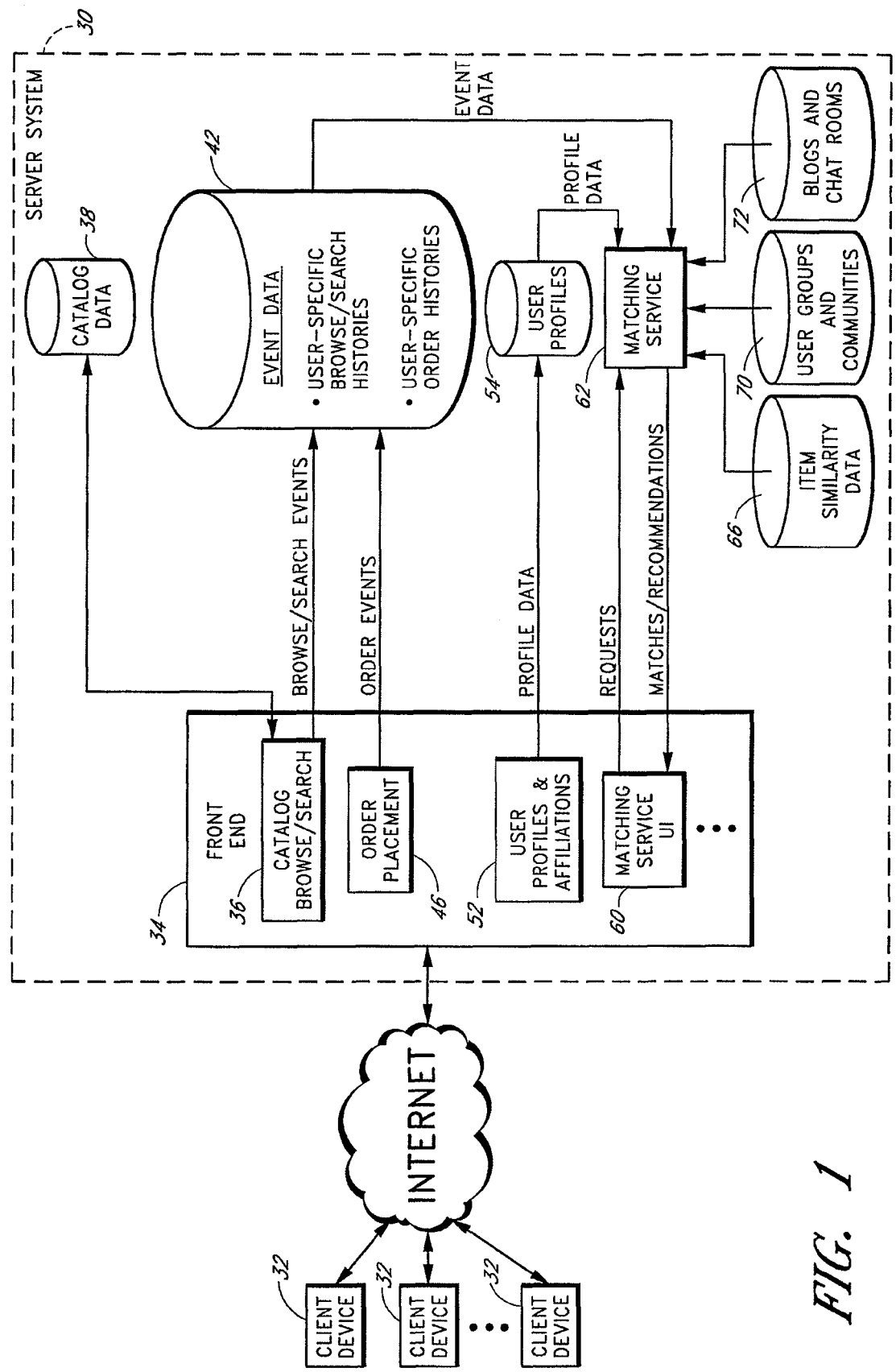
FIG. 1 illustrates a system that implements a matching service according to one embodiment of the invention.

FIG. 1 illustrates the functional components of a server system 30 that implements a matching service according to one embodiment of the invention. The system 30 may, for example, be in the form of a web site, or a collection of web sites, that can be accessed via client devices 32 (personal computers, personal digital assistants, mobile phones, set top boxes, etc.) that include web browsing functionality. The system 30 may alternatively be in the form of an online services network, an interactive television system, or another type of multi-user interactive system.

As depicted in FIG. 1, the system 30 includes a front end 34 which may, for example, be implemented as a collection of executable code modules and associated content. The front end 34 includes a catalog browse/search component 36 that provides functionality for users to interactively browse and search an electronic catalog of items, such as but not limited to products that are available to purchase and/or rent via the system 30. The items represented in the electronic catalog may, for example, include book titles, movie titles, and/or video titles in various media formats (e.g., physical books, electronic books, books on tape, movie titles on DVD, movie titles on VCR tape, video downloads, CDs, downloadable music files, etc.). Other categories of items that may be represented in the catalog include, but are not limited to, consumer electronics, software, tickets for entertainment events, tickets for travel, sporting goods, gourmet food, magazine subscriptions, articles, and web sites. The items represented in the electronic catalog may also include or consist of services, such as but not limited to cellular phone services, Internet access services, and web site hosting services. Many thousands or millions of different items may be represented in the catalog.

Descriptions of the various items that are represented in the catalog are retrieved from a catalog data repository 38, which may be implemented as a database or a collection of databases. The items may be arranged within the repository in a hierarchy of item categories and subcategories, which may be exposed to users as respective nodes of a browse tree. In one embodiment, when a user locates a particular item in the catalog (e.g., by conducting a search or navigating a browse tree), the user can "click-through" to a corresponding item detail page to view detailed information about the corresponding item. In the case of products, an item's detail page may provide an option to purchase the item new and/or used from one or more sellers. The front end 34 may also provide functionality for users to rate and review items represented in the catalog, and to view the ratings and reviews of other users.

As depicted in FIG. 1, as users browse and search the catalog, one or more different types of user-generated events may be recorded in a data repository 42 of event data. For example, each search query submission and each click-through to an item detail page may be recorded in the data repository 42 in association with the particular user. Other types of events that reflect the item or product preferences of users, such as accesses to browse nodes (item categories) of a browse tree, may also be recorded. One example of a software and hardware architecture that may be used to capture and provide access to user event histories is described in U.S. Patent Pub. 2005/0033803 A1, the disclosure of which is hereby incorporated by reference. As described below, the collected browse/search event data is one type of information that may be taken into consideration in matching users with other users and/or user communities.

In some embodiments, event data reflective of user actions may also be collected from one or more other sources. For instance, users of the matching service may be permitted or required to install, on their respective client devices 32, a browser plug-in, such as a browser toolbar program, that reports each web user's browsing and searching activities to the system 30. In such embodiments, the event data analyzed for purposes of matching users may reflect user browsing activities across many different independent web sites. For instance, the browser plug-in installed on each user's client device 32 may report, to a server associated with the matching service 62, every URL (Uniform Resource Locator) accessed by the user on the Internet, in which case the matching service may seek to identify users who tend to browse the same or similar web sites and pages. The plug-in may also report the search queries submitted by each user, and the associated search result items selected by the user. Examples of browser plug-ins that may be used to implement these features are described in U.S. Patent Publication 2005/0033803 A1 and U.S. Pat. No. 6,691,163, the disclosures of which are hereby incorporated by reference.

Information about users' preferences for particular network resources (web sites, web pages, blogs, etc.) may also be collected without requiring users to install a browser plug-in, or any other special software, on their respective computing devices 32. For example, such preference information can be collected by providing an Internet search engine system that records users' selections of particular links on search results pages. With this method, when a user clicks on a search results link corresponding to a particular external URL, the user's selection is initially recorded by a server associated with the search engine, and the user's browser is then redirected to the external URL. This method is described in U.S. Patent Publication 2005/0033803 A1, referenced above. As another example, a browsable web site directory may be set up for purposes of assisting users in locating web sites of interest, and each user's selections, from this directory, of particular web sites to access may be recorded. This method is described in U.S. application Ser. No. 10/766,368, filed Jan. 28, 2004, the disclosure of which is hereby incorporated by reference. As yet another example, a server system that tracks user referrals generated by affiliate web sites in an affiliate marketing program, as described, e.g., in U.S. Pat. No. 6,029, 141, may keep track of affiliate web sites accessed by each user, and report this information to the matching service. In all of these examples, the information about the users' preferences may be collected directly by the provider of the matching service, or may be obtained through partnerships with other online business entities.

As further depicted in FIG. 1, the front end 34 in the illustrated embodiment also includes an order placement component 46 that provides functionality for users to place orders for specific items represented in the catalog. The orders may include purchase orders and/or rental orders, and may be fulfilled by one or more business entities associated with the system 30. Each order event, including an identifier of the user, identifiers of the item or items ordered, and the date/time of the order, is recorded in the repository 42 of event data. (In the context of DVD rentals using rental queues, a DVD may be treated as ordered by a user if, for example, the DVD is actually shipped to the user). The repository 42 thus includes the order history of each user of the system 30 in the illustrated embodiment. Although the order event histories of users (including purchase and/or rental histories) provide a highly effective mechanism for matching users to other users, as will be apparent, the invention can be practiced, in some embodiments, in systems that do not provide functionality for ordering items. For example, in the context of a web site for users to post ratings and reviews of particular items, the matching service may identify users with similar interests based on the item rating activities of users.

Although a single repository 42 of event data is depicted in FIG. 1, different types of event data may be stored in different databases and/or on different physical machines. For example, browse and search event data may be stored in one database of the repository 42, and order event data may be stored in another database of the repository 42.

As depicted by the block 52 labeled "user profiles and affiliations" in FIG. 1, the front end 34 may also provide functionality for users to post personal profiles of themselves for viewing by other matching service participants. For example, a user may upload a personal description and photo of himself or herself, which may be presented to others via a personal profile page. To encourage users of the matching service 62 to supply profile information that is helpful to the matching process, that matching service may, over time, ask a given user to answer one or more targeted questions, such as "what is your favorite hobby?" or "what is your favorite television show?" These questions may be presented incrementally over time so that the users are not burdened with having to fill out lengthy forms.

The system 30 may also provide functionality for users to explicitly affiliate themselves with specific user groups or "communities." For instance, users may be able to browse descriptions of user communities that are defined within the system, and to join selected communities for purposes of communicating with other users. Each such community may represent or correspond to a respective subset of the users of the system 30. Information about the profiles and group affiliations of users is recorded in an associated user profiles repository 54.

Although the embodiment depicted in FIG. 1 allows users to create and publish personal profiles, as will be apparent from the description below, the present invention may be implemented without requiring users to create personal profiles, and/or without using such profiles to match users. The invention may also be implemented in a system that does not provide functionality for users to affiliate themselves with any user groups or communities.

With further reference to FIG. 1, the front end 34 also includes a matching service user interface (UI) 60 that provides access to the matching service 62. The matching service may, for example, be made available to all registered users of the system 30, or to all registered users that meet certain criteria (e.g., have ordered a threshold number of items). As is typical where the sharing of personal information is involved, users may be required to "opt in" before their personal information is exposed to other matching service participants. As part of the process of opting in, users may be given the option to expose their respective order histories, or selected portions of such order histories, to other matching service users. The users may also be given the option to expose other types of event and activity data, including their respective search histories and web browsing histories.

In one embodiment, the matching service 62 operates in part by analyzing some or all of the collected user event data to identify users that tend to have affinities for the same or similar items, or that otherwise have similar characteristics. A clustering algorithm, and/or an algorithm that calculates degrees of similarity between specific pairs of users, may be used for this purpose. The items may, for example, include physical products, downloadable products, and/or services. As depicted in FIG. 1 and described below, a database of item similarity data 66 may optionally be used by the matching service 62 to evaluate the degrees to which the items purchased or otherwise selected by two users are similar.

The type or types of event data analyzed by the matching service 62 may vary widely depending upon the nature and purpose of the particular system 30. For example, in the context of an online store or marketplace, the matching service may primarily or exclusively analyze user purchase data, which tends to be a very strong indicator of the item preferences of users. In systems that do not support online sales of items, the analysis may be based on one or more other types of user-generated events, such as but not limited to item rental events, item rating events, item viewing events, page viewing events, page revisit events, search query submissions, accesses to particular web sites, cell phone usage events, and/or other types of activities that can be monitored or tracked via a computer network.

As part of the analysis of the event data, the matching service 62 may give greater weight to specific types or categories of events that tend to strongly reflect the traits, interests, or hobbies of users. For example, in the context of an online store that sells books and CDs, greater weight may optionally be accorded to book purchases than to music purchases based on the assumption that book purchases more strongly reflect the traits and interests of the particular user. Further, in the context of book sales, a purchase of an instructional book regarding a particular hobby or activity (e.g., rock climbing or scuba diving) may be given more weight than a purchase of a book in the "fiction" category. The weight given to the purchase of a particular item may also be dependent upon (e.g., directly proportional to) the price paid for the item. In addition, as described below, the weight given to the purchase or rental of a particular item may be dependent upon the current popularity level of the item, as determined based on one or more types of user actions (purchases, rentals, item viewing events, etc.) of a population of users.

More generally, the matching service 62 may apply one or more weighting heuristics that give greater weight to some types of events or behaviors than others. The heuristics may be defined so as to give the most weight to events that are deemed to be the best indicators of the interests and traits of the associated users.

The results of the event data analyses are used by the matching service—optionally in combination with other criteria such as user-supplied profile data or screening criteria—to select users to be recommended or "matched" to other users. Two users that are selected by the service to be matched to each other are referred to herein as matching users. The matching service may identify matching users in real time in response to queries from users, and/or may identify matching users periodically in an off-line or batch processing mode. Examples of specific similarly metrics that can be calculated to measure user-to-user similarity are described below. Upon identifying a pair of matching users, the service 62 may notify one or both users of the other user, and may provide a messaging option for the two users to communicate.

In addition to matching users to other users, the matching service 62 may provide a service for matching individual users to specific groups or communities of users. These communities may, for example, include "explicit membership" communities that users explicitly join for purposes of communicating about particular subjects or topics. For instance, an explicit membership community may exist for the topic of digital photography. The communities may also include "implicit membership" communities that consist of users who share a common attribute. For example, all users of the system that have the string "redcross.org" in their respective email addresses may automatically be treated by the system as being members of the implicit membership community "Red Cross Employees." Thus, for example, users may use the user-to-community matching feature to identify specific communities or user groups to join, and/or to identify specific companies or organizations with which to seek employment. As depicted in FIG. 1, information about the various communities that are defined within the system 30 may be stored in a database 70 that is accessed by the matching service 62.

The user-to-community matching functionality may be implemented in-part by periodically analyzing the purchase event histories, rental event histories, and/or other event data of all or a representative sampling of all users to identify, for each user community, a set of catalog items that are significantly more popular in the respective user community than in a general user population. For example, the purchase histories of users with "redcross.org" in their respective email addresses may be compared to the purchase histories of all users to identify any items that are significantly more popular among Red Cross employees. These items are referred to as the community's "characterizing items," as they characterize the item preferences of the community relative to the preferences of a more general user population. Examples of algorithms that may be used to identify the items that characterize particular user communities are described in U.S. application Ser. No. 09/377,447, filed Aug. 19, 1999, the disclosure of which is hereby incorporated by reference. To assess the degree to which a given user matches a user community, the user's order history, and/or other information about the user's item preferences, can be compared to the community's set of characterizing items using the similarity metrics described below.

As depicted by the data repository 72 labeled "blogs and chat rooms" in FIG. 1, the matching service may also include functionality for matching users to blogs, chat rooms, and/or other types of electronic forums for sharing information. This may be accomplished by, for example, identifying keywords and keyword phrases that characterize a user's purchases, searches, and/or other types of events, and matching these keywords and keyword phrases to content associated with specific blogs and chat rooms. In the case of chat rooms, a user could also be matched to a chat room by, for example, calculating a degree to which the user's order history is similar to the order histories of a chat room's participants.

II. Example User Interface

Examples of web pages or screens that may be provided by the matching service 62 to facilitate interactive searches will now be described with reference to FIGS. 2A, 2B, 3A, and 3B. It should be understood, however, that the present invention does not require the use of such pages or screens, and does not require the ability for users to conduct interactive searches. For example, the matching service 62 may automatically match users, and output its results, without requiring users to conduct or initiate searches.

Figure 2A:
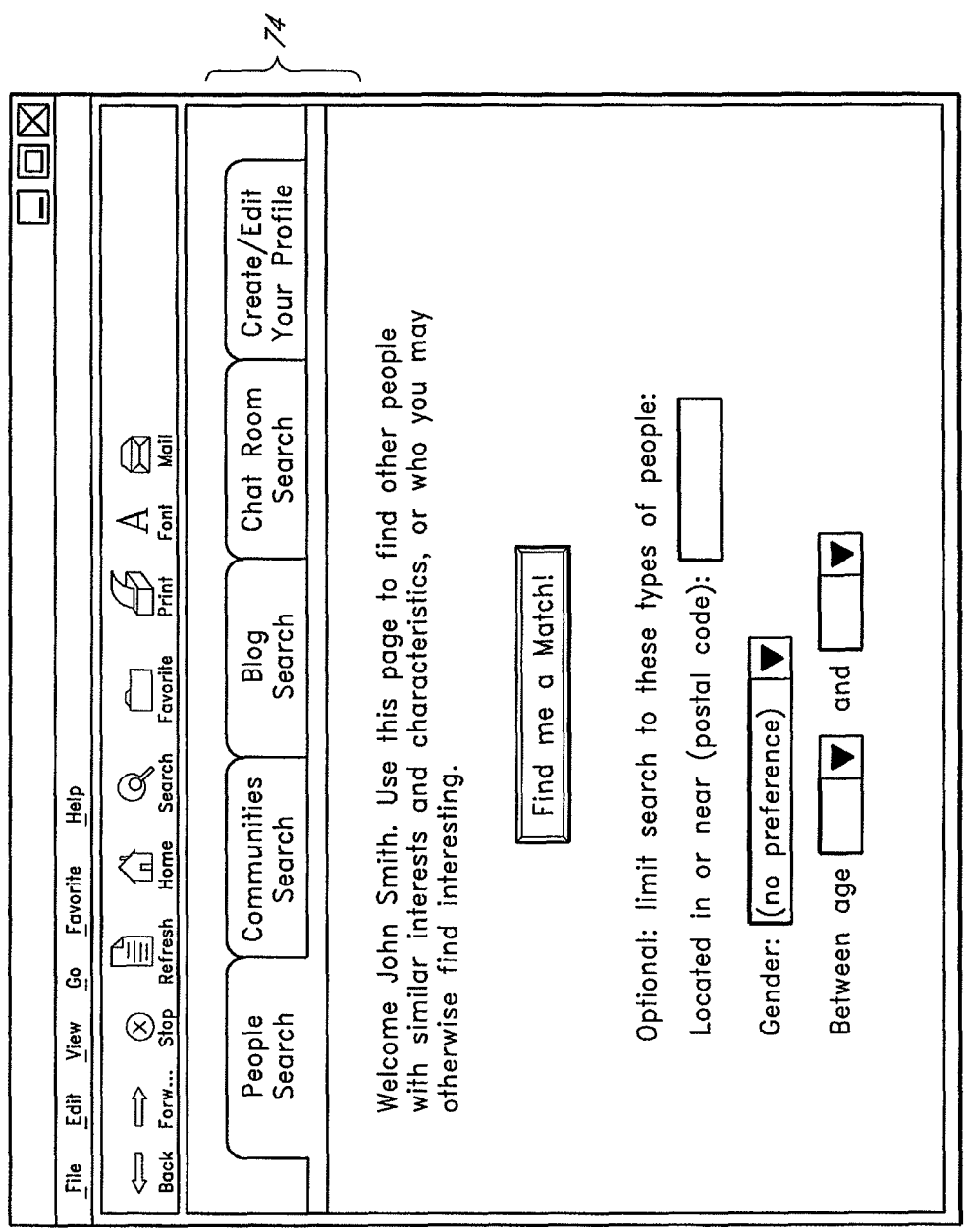
FIG. 2A illustrates an example search screen that may be provided by the matching service to support interactive searches for people.

FIG. 2A illustrates one example of a search page for conducting searches for other people. By clicking on the button labeled "find me a match," a user can initiate a search for other people with similar interests and/or characteristics. The user conducting the search (the "searcher") can initiate the search, in one embodiment, without first creating a personal profile with the matching service 62. To limit the scope of the people search, the searcher can optionally specify a particular location, gender, and/or age range. If the searcher supplies such additional search criteria, the search results may, in some cases, be limited to users who have explicitly created personal profiles with the matching service.

The web page shown in FIG. 2A includes respective tabs 74 for accessing a "communities search" page (shown in FIG. 3A), a "blog search" page, a "chat room search" page, and a personal profile page. The personal profile page (not shown) may provide functionality for users to create and/or edit their respective personal profiles. If such a profile is provided, it may be partially or fully exposed to other matching service participants. The personal profiles, where provided, may also be used to improve the accuracy of the search results/recommendations provided by the matching service 62. The personal profile page, and/or other pages of the matching service UI, may also provide an option for users to specify and/or prioritize the types of recorded user actions and events that are taken into consideration in conducting searches. For example, a user may have the option to exclude from consideration, and/or to specify weights that are to be given to, certain item purchases (or categories of purchases), and/or certain browsing events (or categories of browsing events).

Figure 2B:
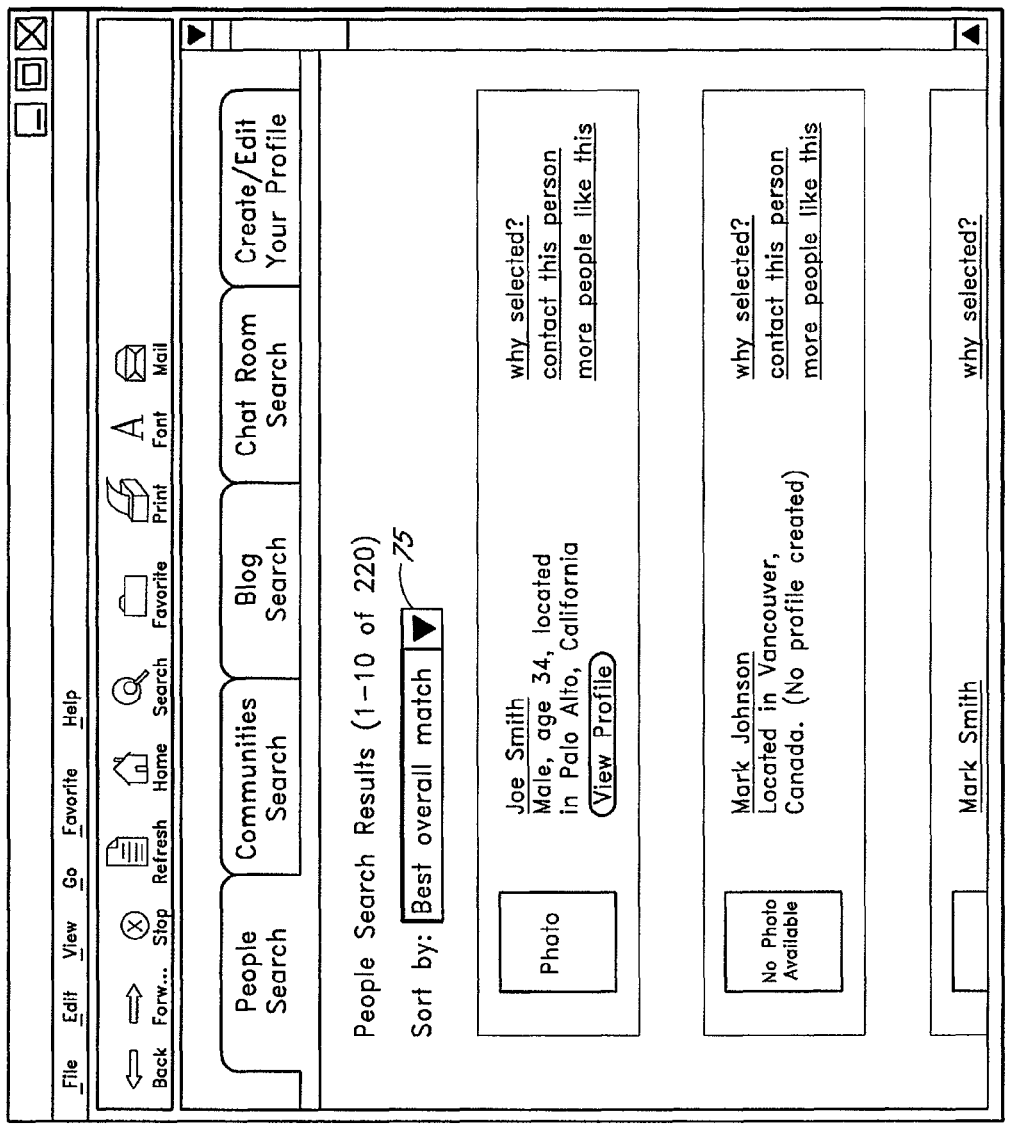
FIG. 2B illustrates an example search results page for a people search.

FIG. 2B illustrates one example of a "people-search results" page that may be provided by the matching service 62 in response to a search request generated from the page in FIG. 2A. The first hypothetical user listed on this page ("Joe Smith") has created a matching service profile; as a result, the associated search result listing includes this user's photograph, a summary of his personal profile, and a link to his personal profile page. The second user listed on the search results page ("Mark Johnson") has not created a matching service profile. As a result, the only information displayed about this second user is his location, which may be based, e.g., on his shipping or credit card address used in connection with e-commerce transactions, or on his IP address.

To generate people-search results of the type depicted in FIG. 2B, the matching service 62 may take into consideration a wide range of different types of recorded user activity and behaviors. For example, as mentioned above, the matching service may take into consideration each user's item purchases, item rentals, item viewing activities, item rating activities, search query submissions, and/or web browsing activities. The matching service may additionally or alternatively take into consideration other types of information about each user, including, by way of illustration and not of limitation, any one or more of the following: (1) gift purchases made by other users for this particular user; (2) the gift wrap used by such other users when purchasing gifts for this user, such as when the gift wrap evidences the user's religion (in the case of Christmas or Hanukkah gift wrap, for example); (3) the time of day at which the user typically engages in online activity; (4) the location (e.g., city) or locations from which the user accesses the matching service 62 or otherwise engages in online activity, as may be determined reasonably accurately based on IP addresses associated with the user computing devices; (5) any blogs, RSS feeds, email newsletters, and/or other content channels to which the user subscribes; (6) the user's item rating profile, which may be collected, e.g., by systems that provide functionality for users to rate particular items represented in an electronic catalog; (7) the user's "reputation" for supplying high quality item reviews or other content as determined based on votes cast by other users, as described, for example, in U.S. application Ser. No. 09/715,929, filed Nov. 17, 2000 and Ser. No. 10/640,512, filed Aug. 13, 2003, the disclosures of which are hereby incorporated by reference; (8) the user's residence location, as determined or inferred based on the shipping or credit card address supplied by the user for purposes of conducting online transactions; (9) the company or type of company the user likely works for, as determined or inferred from the user's email address (e.g., the email address JoeDoe@apple.com likely identifies a user who works for Apple Computer); (10) the user's travel preferences, as determined based on online ticket purchases; (11) the user's cell phone usage; (12) the user's music download history; (13) news articles selected by the user for viewing online; (14) the television programs selected by the user via an online television programming guide used to program digital video recorders; (15) the other matching service participants selected by this user to contact or read about; (16) specific communities selected by the user to join or read about; (17) information about how the user has redeemed loyalty points associated with a credit card, frequency flyer program, or other loyalty program; (18) the user's preferences for particular types or clusters of search results on search results pages, (19) the user's credit card transactions. Data regarding these and other types of user behaviors may be collected, and incorporated into the matching process, via automated processes such that the users need not affirmatively perform any action to supply the matching service with such information.

As illustrated in FIG. 2B, the "people-search results" page displays, for each located user, a link labeled "why selected," and a link labeled "contact this person." If the searcher clicks on "why selected," the matching service 62 returns a web page (not shown) with information about why this user was selected to recommend. This information may include, for example, summarized information about the common interests and behaviors of the two users (i.e., the searcher and the located user). For example, the "why selected" information may identify that the two users have similar preferences for books, book genres, authors, DVDs/movie titles, actors, music categories, musical artists, albums, web sites, blogs, chat rooms, topics, television shows, matching service participants, and/or user communities.

The link labeled "contact this person" in FIG. 2B can be selected by the searcher to access a form for sending a message to the located user. This message may be conveyed by email, via a web page, via an instant message, or using any other appropriate communications method. Whenever a first user contacts a second user via such a link, the event may be recorded in association with the first user, and thereafter taken into consideration in identifying people and communities to recommend to the first user.

The people-search results page shown in FIG. 2B also displays, for each located user, a link labeled "more people like this." Selection of this link causes the matching service 62 to search for, and return a list of, people who are similar to the corresponding located user. This search may be conducted using the same type or types of event data as listed above, and using the same types of similarity metrics as described below.

With further reference to FIG. 2B, the people-search results page also includes a drop down box 75 for sorting the search results by one or more criteria. This drop down box 75 may provide an option to sort the search results by, for example, any one or more of the following: best overall match, closest in location, most similar purchase history, most similar rental history, most similar book preferences, most similar music preferences, most similar DVD/movie preferences, most similar web site preferences, closest match based on personal profile. Thus, the searcher can interactively sort the search results to locate users having desired characteristics.

Figure 3A:
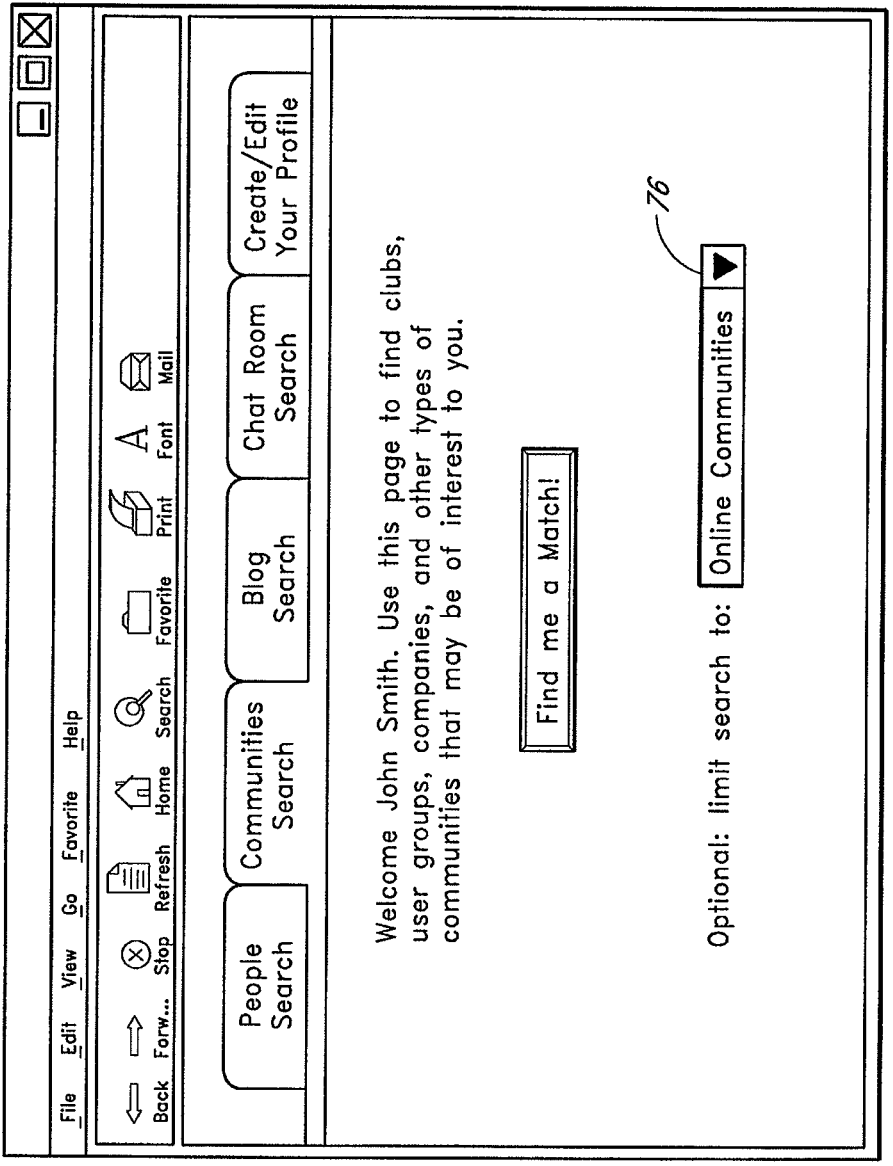
FIG. 3A illustrates an example search screen that may be provided by the matching service to support searches for user communities.

FIG. 3A illustrates one example of a search page for conducting searches for user communities. By clicking on the button labeled "find me a match," a user can initiate a search for specific communities, such as offline and online clubs and organizations, which may be of interest to the user. The matching service 62 may conduct this search using the same type or types of user data as mentioned above for people searches, and without requiring the searcher to first create a personal profile. In the particular example shown in FIG. 3A, a drop down box 76 is provided to allow the searcher to limit the scope of the search to a specific type of community, such as online communities, offline communities, companies, clubs, professional organizations, and/or local organizations.

Figure 3B:
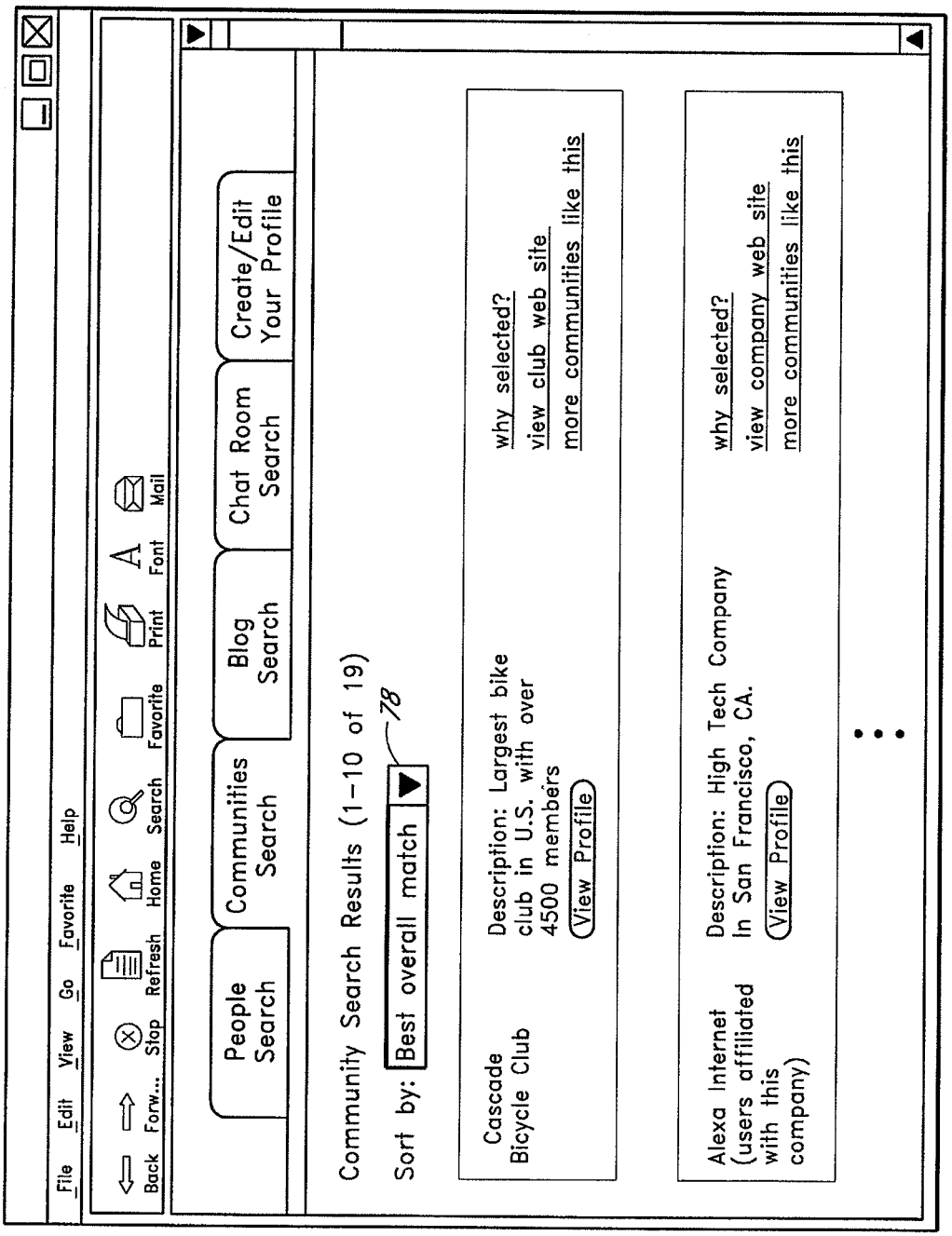
FIG. 3B illustrates an example search results page for a community search.

FIG. 3B illustrates one example of a "community-search results" page that may be provided by the matching service 62 in response to a search request generated from the page in FIG. 3A. Two communities that are responsive to the search request are shown. The first is the Cascade Bicycle Club, which may be an actual organization with which users can become affiliated via a user interface of the system 30. The second community is an implicit-membership community (one that cannot be joined via the system 30) consisting of users having the string "alexa.com" in their respective email addresses, indicating likely employment by the company Alexa Internet. The ability for the searcher to locate a company whose employees have similar interests or characteristics to his or her own may be useful where, for example, the searcher is looking for a company with which to seek employment.

For each of the located communities, the community-search results page of FIG. 3B displays a short description of the community, and displays a "view profile" button for accessing more detailed information. The community information that is viewable via the "view profile" button may, for example, include one or more of the following: (a) a list of the items (books, music titles, video/DVD titles, etc.), or categories thereof, that characterize, or tend to be uniquely or unusually popular in, the corresponding community; (b) other types of characterizing actions or behaviors of members of this community, such as characterizing searches, characterizing item rentals, and/or characterizing web site affinities; (c) a list of users affiliated with this community, together with links for contacting these users; (d) if applicable, a link to a form for joining the community.

With further reference to FIG. 3B, the community-search results page also displays the following links for each located community: a "why selected" link, a link for accessing the community's web site (if such a web site exists), and a link for initiating a search for more communities similar to the one shown. As with the people-search results page of FIG. 2B, the "why selected" link may be selected by the searcher to view information about why the particular community was selected to recommend. This information may include, for example, summarized information about common interests and behaviors of the searcher and members of this community. For example, the "why selected" information may identify that the characterizing book purchases of the community are similar to the book purchases of the searcher, or may otherwise specify the types of behaviors/interests the searcher has in common with members of the community. The community-search results page also includes a drop down box 78 for sorting the search results by one or more criteria, such as those listed above for people searches.

Although not depicted in the example web pages shown in FIGS. 2A, 2B 3A and 3B, the matching service UI may also include a web form for providing relevance feedback to the matching service 62, such as a rating on a scale of 1 to 5, regarding the quality or accuracy of each recommendation. Where a relevance feedback option is provided, any feedback provided by a user may be taken into consideration by the matching service in generating subsequent recommendations for the corresponding user. Various other user interface pages and functions may be provided for performing other types of actions associated with the matching service 62. Further, the system 30 may implement some or all of the features described in U.S. Pat. No. 6,269,369, the disclosure of which is hereby incorporated by reference, which discloses a network-based contact management system in which users can establish links to other users for purposes of sharing information.

III. Purchased-Based Similarity Metrics

In one embodiment, the matching service 62 calculates one or more similarity metrics that reflect the degree to which two users are similar. These metrics may be used individually or in combination by the matching service to determine whether these two users should be matched to one another. This section describes several examples of metrics that can be generated based on users' purchases. As described in the following sections, these metric calculations can also be applied to other types of event data, such as event data descriptive of item rental events, item viewing events, page viewing events, web browsing patterns, and/or search query submissions of users. In addition, as described in section VIII, the same or similar metrics can be used to match users to communities.

One purchase-based similarity metric that can be used is the total number of purchases two users have in common. If used alone as the sole metric for measuring user similarity, the users matched to a particular "target user" may be those who have the greatest number of purchases in common with the target user. For purposes of counting common purchases, two items may be treated as the same if they merely differ in format or version; for example, the hardcover, paperback and electronic versions of a given book title may be treated as the same item, and the video tape, DVD, and video-on-demand versions of a given movie title may be treated as the same item.

Rather than merely considering total numbers of purchases in common, a similarity score can be generated that gives greater weight to purchases of items that tend to strongly reflect the interests and traits of the purchasers. For example, book titles may be accorded a weight of 10, music titles a weight of 5, video/DVD titles a weight of 3, and all other items a weight of 1. Using these weight values, if users A and B have common purchases as listed below, the similarity score for this pair of users would be $(10 \times 2)+(5 \times 4)+(3 \times 3)+(1 \times 9)=58$:

2 book titles;
4 music titles;
3 video/DVD titles; and
9 items falling in other product categories.

The weights applied to specific purchases may also be dependent upon the popularity levels or sales ranks of the associated items. For example, greater weight can be given to a common purchase of a relatively unpopular or obscure item than to a common purchase of a relatively popular item. This may be accomplished, for example, by scaling the weight by a factor of two if the commonly purchased item has a sales rank that falls below a selected threshold. For instance, a common purchase of a book falling below the sales rank threshold may be accorded a weight of 20, while a common purchase of a book falling at or above the sales rank threshold may be accorded a weight of 10. Another approach is to calculate and use a scaling factor that is inversely proportional to the item's sales rank.

Rather than merely considering item purchases that are common to both users, a similarity metric may be generated that also takes into consideration items that were purchased only by one of the two users. This may be accomplished by, for example, calculating a normalized score (NS) according to the following equation, in which $N_{common}$ is the number of items common to the purchase histories of both users, SQRT is a square-root operation, $N_A$ is the total number of unique items in user A's purchase history, and $N_B$ is the total number of unique items in user B's purchase history:

$$NS = N_{common}/\text{SQRT}(N_A \times N_B) \qquad \text{Eq. 1}$$

With this approach, NS can vary from zero to one, with higher values indicating higher degrees of similarity between the two users. To weight some types of purchases more heavily than others, different NS values may be generated for different types or categories of purchased items. For example, equation 1 can be applied to all book purchases of users A and B to generate a book-specific normalized score, $NS_{books}$. Similarly, equation 1 can be applied separately to the music purchases, video/DVD purchases, and "other" purchases of users A and B to generate, respectively, $NS_{music}$, $NS_{videos}$, and $NS_{other}$. To ensure statistically meaningful results, some minimum number of purchases may be required of users A and B within a given item category before a normalized score is generated for that item category. These normalized scores may be combined to generate a composite normalized score. For instance, using the weighting values from the example above, a composite normalized score $NS_{composite}$ may be calculated as $(10NS_{books}+5NS_{music}+3NS_{videos}+NS_{other})/19$.

Both the composite normalized score and the constituent normalized scores may be considered in determining whether users A and B are sufficiently similar to recommend one user to the other. For example, $NS_{books}$, $NS_{music}$, $NS_{videos}$, $NS_{other}$ and $NS_{composite}$ may each be compared to a respective threshold that, if exceeded, will cause a match event to be triggered. If a match is triggered, appropriate messaging may be provided to indicate the area in which the users have a common interest. For example, if user A is conducting a search, and user B is displayed in the search results because $NS_{books}$ and $NS_{music}$ exceed their respective thresholds, user A may be notified that user B has similar preferences for books and videos.

The product categories (books, music, videos and other) in the above examples are merely illustrative. The actual product categories used, if any, will generally be dependent upon the nature and purpose of the particular system 30 associated with the matching service. For instance, if the system is strictly a music store, each product category may correspond to a particular type of music, such as pop, jazz, and classical.

To reduce the quantity of real time processing performed each time a user conducts a search (assuming an interactive search interface is provided), the matching service 62 may periodically execute a clustering algorithm that groups the overall population of matching service participants into multiple clusters. For instance, all users that have at least two purchases in common may be clustered together. At search time, the user conducting the search may be compared only to those users who are members of a cluster of which the searcher is a member. With this approach, the number of real time user-to-user comparisons performed may, for example, be reduced from hundreds of thousands to several hundred.

The foregoing are merely examples of the types of metrics that can be used to identify users with similar interests or behaviors. A wide range of other types of heuristics and metrics may additionally or alternatively be used. As one example, the event histories of an entire population of users may be programmatically analyzed to generate association rules that associate particular user behaviors or interests. For instance, by collectively analyzing the purchase histories of users, an association rule may be generated which indicates that users who purchase items A and B are likely to be interested in items C and D; this association rule may in turn be used as a basis for recommending, to a target user who has purchased items A and B, a user who has purchased items C and D. As another example, the actions of users associated with particular user communities may be analyzed to generate an association rule indicating that users who purchase items F, G and H are likely to be interested in a particular user group or community; this rule may then be used to recommend the community to users who purchase items F, G and H.

Although the scores discussed in the foregoing examples are in the form of numerical values, scores in the form of vectors, character data, sets of values, and other types of elements may be used.

IV. Similarity Metrics Based On Other Types of Item Selection Events

A purchase of an item is one type of item selection action that can be taken into consideration in evaluating degrees to which users are similar. Other types of item selection actions/events that reflect user affinities for particular items may additionally or alternatively be taken into consideration. For instance, user similarity may additionally or alternatively be measured based on any one or more of the following: (a) the items selected to rent by each user, (b) the items selected to add to a shopping cart by each user, (c) the items selected to add to a rental queue by each user, (d) the items selected by each user to rate or review, (e) the items selected for viewing by each user, (f) the items added to a personal wish list by each user, (g) in the case of music files, the items (song titles or tracks) added to a personal play list by each user, (h) user selections or "click throughs" of search result items listed on search results pages, (i) user selections of items, such as web sites or pages, to bookmark.

Thus, equation 1 above may be generalized to any type of item selection activity that evidences user affinities for particular items. This may be accomplished by redefining the variables of equation 1 as follows: $N_{common}$=number of items common to the item selections of both users, $N_A$=total number of unique items selected by user A, and $N_B$=total number of unique items selected by user B. Where multiple different types of user activity are taken into consideration, different weights may be applied to different types of item selection events. For example, item purchases may be accorded a weight of ten while item viewing events may be accorded a weight of one; this may be accomplished, for example, by generating a purchase-based normalized score, $NS_{purchase}$, and a viewing-based normalized score, $NS_{view}$, and calculating the weighted normalized score $NS_{weighted}$=$(10NS_{purchase}+NS_{view})/11$.

V. Accounting for Item Similarities

As mentioned above, the matching service 62 may also take into consideration whether, and/or the extent to which, an item selected by one user is similar or related to an item selected by the other user. For example, if two users purchased books about mountain climbing, the service may treat these purchases as evidencing a similarity in user interest even though the two books are not the same.

To implement this feature, the matching service 62 may access a database 66 (FIG. 1) of information about items that are similar or related to one another. This database may, for example, be generated automatically by performing a correlation analysis of purchase histories, item viewing histories, and/or other types of item selection actions of users. As one example, two products may be treated as similar if a relatively large number of the users who purchased one product also purchased the other product. As another example, two products may be treated as similar if a relatively large number of the users who viewed one product also viewed the other product during the same browsing session. Similar items may also be identified by programmatically analyzing item content descriptions to identify items that are characterized by the same or synonymous keywords and keyword phrases.

Examples of algorithms that may be used to build a database 66 of item similarity data based on item selections of users are described in U.S. Pat. No. 6,853,982, the disclosure of which is hereby incorporated by reference. As described in the '982 patent, the similarity data may include data values indicating degrees to which specific pairs of items are similar. These data values may be taken into consideration in measuring the degree to which two sets of items (e.g., those purchased by two different users) are related.

Another approach is to treat two items as similar if they are both members of the same bottom-level node/category of a browse tree. Yet another approach is to measure the degree to which specific items are related by comparing the textual catalog descriptions of such items, as mentioned above.

The matching service may optionally accord a lesser degree of weight where the item purchased (or otherwise selected) by one user is similar to, but not the same as, an item purchased by another user. This may be accomplished by, for example, calculating one score that is based on item commonality, and another score based on item similarity, and by taking a weighted average of these two scores.

VI. Measuring User Similarity Based on Category Preferences of Users

In addition or as an alternative to the methods described above, user similarity may be measured based on the degree to which the item category preferences of two users are similar. For example, the matching service 62 may maintain a category preferences profile for each user. These profiles may be based on item purchases, item viewing events, browse node selection events, and/or other types of user activity. Specific examples of algorithms that may be used to generate category preferences profiles are described in co-pending U.S. patent application Ser. No. 10/684,313, filed Oct. 13, 2003, the disclosure of which is hereby incorporated by reference. A user's category preferences profile may, for example, be updated after each browsing session of the user, or after each browsing session in which the user performs a particular type of action (e.g., makes a purchase).

VII. Measuring User Similarity Based on User Search Histories

In addition or as an alternative to the methods described above, the matching service 62 may measure user similarity based on histories of the search queries submitted by each user. With this approach, two users may be treated as similar based on the degree to which they have submitted similar or identical search queries. For example, equation 1 above can be used, but with $N_{common}$=number of search queries common to both users, $N_A$=total number of unique search queries submitted by user A, and $N_B$=total number of unique search queries submitted by user B. For purposes of this analysis, two search queries may be treated as the same if they contain the same search terms (where synonymous terms may be treated as the same), disregarding stop words, search term form (e.g., plural versus singular, past versus present tense, etc.), and search term ordering. Two search queries can be treated as similar if, for example, they contain more than a threshold number of terms in common, disregarding common terms and disregarding search term form. Certain types of search queries, such as those with relatively obscure terms or obscure combinations of terms, may be given greater weight than other search queries.

Search context (e.g., book search versus web search versus people search) may also be taken into consideration. In addition, the search result items (search hits) selected by each user from search results pages may be taken into consideration in evaluating the degree to which two users' search histories are similar.

Search history similarity may additionally or alternatively be measured by analyzing the commonality of all search terms submitted by each user, without regard to whether specific search queries are the same or similar.

VIII. Matching Users to Communities

The similarity calculations and metrics described above may also be used to select particular user communities to recommend to a target user. For example, each community may be treated as a single user whose user activity consists of actions that tend to distinguish the community from the general user population. For instance, if purchase histories are used, the characterizing purchases (items) of a given community may initially be identified. This set of characterizing items may then be treated as a purchase history that can be compared to the purchase histories of individual users. If search histories are used, the set of search queries that tend to distinguish the community from the general population may be identified and compared to the respective search histories of individual users.

IX. Example Process Flows

Figure 4:
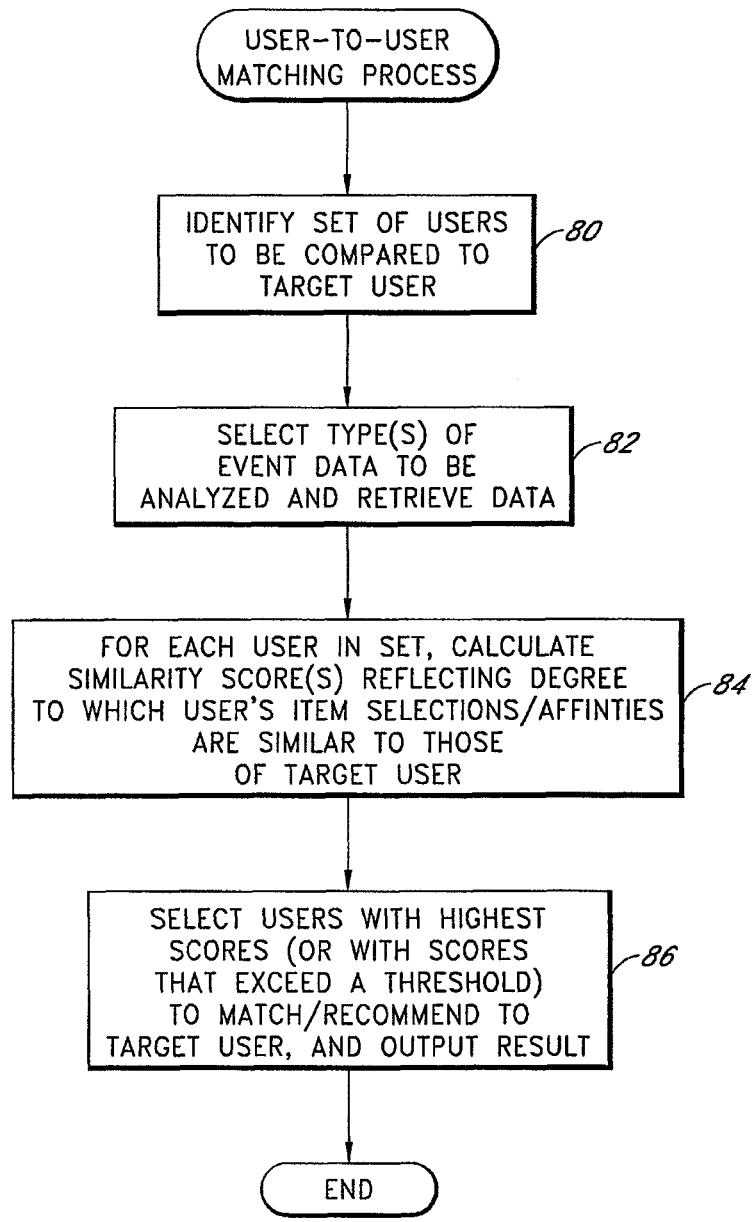
FIG. 4 illustrates one example of a process that may be executed by the matching service to match users to other users.

FIG. 4 illustrates a process that may be executed by the matching service 62 to recommend or "match" users to a target user. This process may be executed in real time (or in an off-line or batch mode) in response to a search request of the target user, or may be automatically executed periodically such that the target user need not submit a search request. In step 80, the matching service identifies a set of users to be compared to the target user. This set of users may, for example, include all matching service participants, or those matching service participants that satisfy screening criteria supplied by the target user (e.g., restrictions based on age, gender, geographic region, etc.). In addition, as described above, a clustering algorithm may be executed periodically to group like users into clusters, in which case the set of users identified in step 80 may consist of users that belong to a cluster of which the target user is a member. If a clustering algorithm is used, users may be clustered based, for example, on their item purchase histories, item rental histories, item viewing histories, search query submissions, web browsing patterns, search result selection histories, age, location, gender, and/or other attributes.

In step 82 of FIG. 4, the matching service 62 selects the type or types of event data to be used to compare the users, and retrieves such data from the event data repository 42. The event data used for the analysis may, for example, be limited to particular types of user activity (e.g., item purchases), and/or to particular types of items represented in the electronic catalog (e.g., books). As discussed above, the target user may optionally be given the option to specify the types of event data to be considered or excluded.

In step 84 of FIG. 4, the matching service 62 calculates one or more similarity scores for each user in the set identified in step 82. Each such score represents or reflects a degree to which the item selections or preferences of the respective user are similar to those of the target user. As discussed above, different scores may optionally be generated for different categories of items (e.g., books, music, and videos) to separately evaluate whether the two users have similar tastes in each such category.

In step 86, the scores are analyzed and used to select users to match or "recommend" to the target user. This may be accomplished by, for example, selecting the N users having the top scores, or by selecting the users whose scores exceed a selected threshold. As mentioned above, if separate scores are generated for each of multiple item categories, each such score may independently be compared to a corresponding threshold to determine whether to recommend the particular user. Any of a variety of known statistical methods may alternatively be used to select the users to recommend. The results of step 86 may be conveyed to the target user via a web page, an email message, or any other communications method. If the results are presented via a web page or other type of interactive user interface, the user may also be presented with an option to sort these results based on various criteria, such as "best overall match," "closest in location," "closest in book preferences," etc. (see FIG. 2B, discussed above). Selection of such a criterion causes the matching service to reorder the list of users for display.

Figure 5:
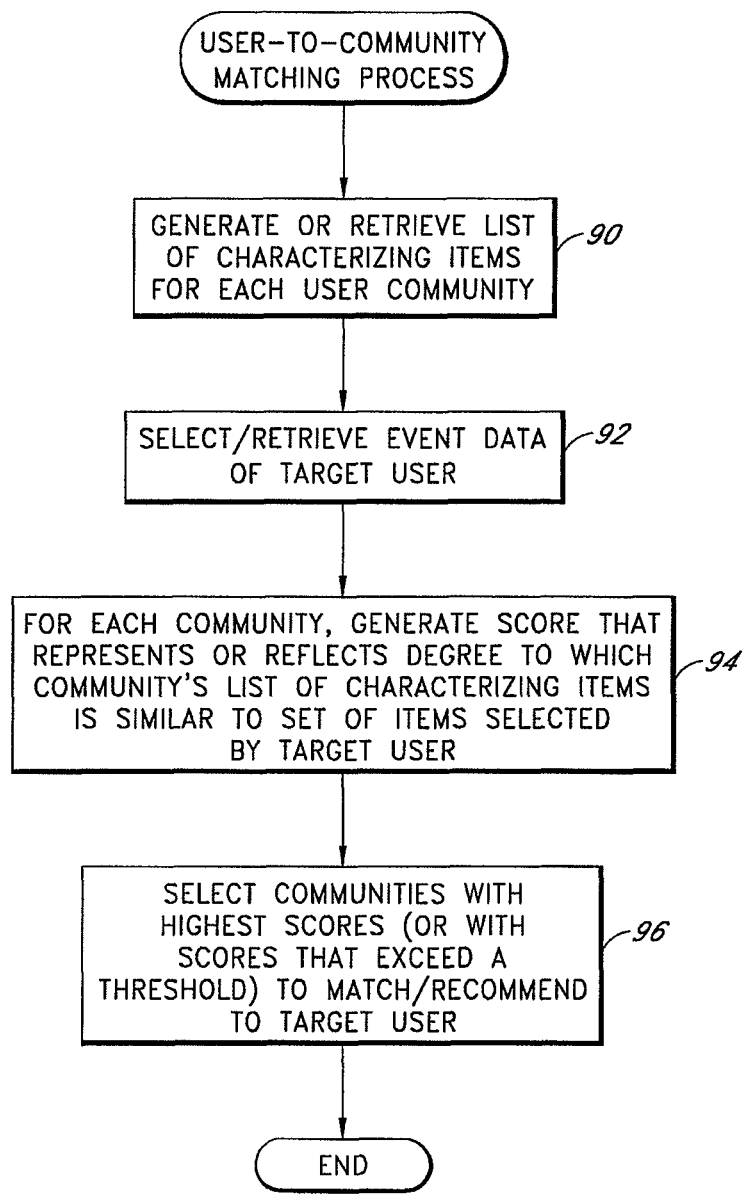
FIG. 5 illustrates one example of a process that may be executed by the matching service to match users to user communities.

FIG. 5 illustrates one example of a process that may be executed by the matching service 62 to match users to communities. As with the process shown in FIG. 4, this process may be executed in real time (or in an off-line or batch mode) in response to a search request of the target user, or may be automatically executed periodically such that the target user need not submit a search request. In step 90, the matching service generates or retrieves, for each user community, a list of the products or other items that characterize that community. As mentioned above, the processing methods disclosed in U.S. application Ser. No. 09/377,447, filed Aug. 19, 1999, may be used to generate such lists. These lists may be generated and stored periodically (e.g., once per month), and thus need not be generated each time the user-to-community matching process is invoked.

In step 92 of FIG. 5, the matching service retrieves the relevant event data for the target user. As with the user-to-user matching process, the target user may optionally be permitted to specify or restrict the types of event data (including the types of items) taken into consideration. In this particular embodiment, the retrieved event data identifies a set of items selected by the target user to purchase, rent, rate, add to a shopping cart, and/or perform some other type of affinity-evidencing action, and thus reflects the item affinities of the target user.

In step 94 of FIG. 5, the matching service generates, for each user community, a score (or possibly multiple category-specific scores) representing the degree of similarity between the characterizing items of the community and the set of items selected by the target user. The scores thus reflect the degree to which the target user's item preferences match those of the corresponding community. In step 96, the scores are analyzed to select user communities to recommend to the target user. This may be accomplished by, for example, selecting the N communities having the highest scores, or by selecting the communities whose scores exceed a selected threshold. If separate scores are generated for each of multiple item categories, each such score may independently be compared to a corresponding threshold to determine whether to recommend the particular community.

One possible variation to the process shown in FIG. 5 is to identify the item categories (rather than the specific items) that characterize each community, and to compare these sets of characterizing item categories to the category preferences of the target user.

X. Hardware Implementation

The matching service 62, including the process flows, metric calculations, and functions described above, may be embodied in (and fully automated by) software code modules executed by one or more general purpose computers. The code modules may be stored in any type of computer storage device or devices (hard disk storage, solid state RAM, etc.). The data repositories 38, 42, 54, 66, 70, 72 shown in FIG. 1 may be implemented using any type of computer storage device or devices, and using any type or types of data repositories (relational databases, flat files, caches, etc.).

The "front end" components 36, 46, 52, 60 depicted in FIG. 1 may, for example, be implemented using one or more physical servers configured to operate as web servers. Each such web server may execute code modules for dynamically generating web pages in response to requests for the client devices 32 of users. These code modules may generate service requests to various back-end services, such as the matching service 62, as needed to respond to requests from the client devices.

In the foregoing description, where the user is said to be provided an option or ability to supply some type of information, it should be understood that this information may be supplied by the user by completing, and electronically submitting to the system 30, a web form that is part of the system's user interface. Other electronic methods for collecting data from users may additionally or alternatively be used.

XI. Web Service Implementations

The matching service 62 may be implemented as a web service that is accessible to other web sites and systems via an API (Application Program Interface). This API may, for example support the ability for other web site systems to query the matching service for recommendations (users, groups, etc.) for a particular target user. Thus, for example, when a user accesses a social networking site that is separate from but affiliated with the matching service, the social networking site may query the matching service for recommendations for this user. The results returned by the matching service 62 in this example may be combined with, or used to refine the results of, the recommendations generated by the social networking site's own matching algorithms.

As another example, when a user accesses a web site associated with a particular organization, a query may be sent to the matching service 62 for information about similar users who are affiliated with this organization. This query may be sent automatically, or in response to a request by the user. The results of this query may be incorporated into one or more web pages served to the user during browsing of the organization's web site.

X. Conclusion

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims, which are intended to be interpreted without reference to any explicit or implicit definitions that may be set forth in any incorporated-by-reference materials.

What is claimed is:

1. A computer-implemented method of matching users to user communities, the method comprising:

for each of a plurality of users of an electronic catalog, storing event data representing user-generated events that reflect user affinities for particular items represented in the electronic catalog;

storing information about a plurality of user communities, each of which corresponds to a respective subset of the plurality of users and comprises multiple users;

identifying a first plurality of items that characterize item preferences of a first user community of the plurality of user communities;

calculating a degree to which the first plurality of items are related to a set of items in the electronic catalog identified by the first user; and based at least in part on the degree, determining whether to suggest the first user community to the first user;

wherein the method is performed by one or more computers.

2. The method of claim 1, wherein calculating the degree comprises accessing item similarity data to determine whether the first plurality of items are similar to the set of items identified by the first user.

3. The method of claim 1, wherein the event data identifies at least one of the following: (a) items purchased by particular users, (b) items rented by particular users, (c) items added to an electronic shopping cart by particular users, (d) items added to a rental queue by particular users, (e) items rated by particular users, (f) items selected for viewing by particular users, (g) search queries submitted by particular users to search the electronic catalog.

4. The method of claim 1, wherein the event data reflects orders placed by users for items represented in the electronic catalog.

5. The method of claim 4, wherein calculating the degree comprises taking into consideration at least one additional type of event data reflective of user affinities for items represented in the electronic catalog.

6. The method of claim 1, wherein the event data identifies books ordered by particular users.

7. The method of claim 1, wherein calculating the degree comprises weighting at least one type of item more heavily than another type of item.

8. The method of claim 1, wherein the first user community is an explicit-membership community that users explicitly join via a user interface associated with the electronic catalog.

9. The method of claim 1, wherein the first user community comprises users having email addresses associated with a particular organization.

10. A system of matching users to user communities, the system comprising:

memory for storing event data representing user-generated events that reflect user affinities for particular items represented in the electronic catalog and for storing information about a plurality of user communities, each of which corresponds to a respective subset of the plurality of users and comprises multiple users; and at least one computing device including a processor in communication with the memory, the at least one computing device operative to:

identify a first plurality of items that characterize item preferences of a first user community of the plurality of user communities;

calculate a degree to which the first plurality of items are related to a set of items in the electronic catalog identified by the first user; and based at least in part on the degree, determine whether to suggest the first user community to the first user.

11. The system of claim 10, wherein calculating the degree comprises accessing item similarity data to determine whether the first plurality of items are similar to the set of items identified by the first user.

12. The system of claim 10, wherein the event data identifies at least one of the following: (a) items purchased by particular users, (b) items rented by particular users, (c) items added to an electronic shopping cart by particular users, (d) items added to a rental queue by particular users, (e) items rated by particular users, (f) items selected for viewing by particular users, (g) search queries submitted by particular users to search the electronic catalog.

13. The system of claim 10, wherein the event data reflects orders placed by users for items represented in the electronic catalog.

14. The system of claim 13, wherein calculating the degree further comprises taking into consideration at least one additional type of event data reflective of user affinities for items represented in the electronic catalog.

15. The system of claim 10, wherein the event data identifies books ordered by particular users.

16. The system of claim 10, wherein calculating the degree comprises weighting at least one type of item more heavily than another type of item.

17. The system of claim 10, wherein the first user community is an explicit-membership community that users explicitly join via a user interface associated with the electronic catalog.

18. The system of claim 10, wherein the first user community comprises users having email addresses associated with a particular organization.

19. A computer-implemented method comprising:
for each of a plurality of users of an electronic catalog, collecting and storing event data representing user-generated events that reflect user affinities for particular items represented in the electronic catalog, said event data collected via a computer network without requiring the users to explicitly provide personal preference information;
analyzing the event data to generate a score that reflects a degree to which behaviors of a first user of said plurality of users are similar to behaviors of a second user of said plurality of users; and
based at least in part on the score, determining whether to output the first user information about the second user;
wherein the method is performed automatically by one or more computers.

20. A system comprising:
memory for storing event data representing user-generated events that reflect user affinities for particular items represented in the electronic catalog, said event data collected via a computer network without requiring the users to explicitly provide personal preference information; and
at least one computing device including a processor in communication with the memory, the at least one computing device operative to:
analyze the event data to generate a score that reflects a degree to which behaviors of a first user of said plurality of users are similar to behaviors of a second user of said plurality of users; and
based at least in part on the score, determining whether to output the first user information about the second user.

* * * * *